United States Patent
Murugan

(10) Patent No.: US 12,500,403 B2
(45) Date of Patent: Dec. 16, 2025

(54) ADJUSTABLE FLOOR BOX

(71) Applicant: Leviton Manufacturing Co., Inc., Melville, NY (US)

(72) Inventor: Thiru Murugan, Wakefield, MA (US)

(73) Assignee: Leviton Manufacturing Co., Inc., Melville, NY (US)

( * ) Notice: Subject to any disclaimer, the term of this patent is extended or adjusted under 35 U.S.C. 154(b) by 161 days.

(21) Appl. No.: 18/039,791

(22) PCT Filed: Nov. 30, 2021

(86) PCT No.: PCT/US2021/061096
§ 371 (c)(1),
(2) Date: Jun. 1, 2023

(87) PCT Pub. No.: WO2022/140019
PCT Pub. Date: Jun. 30, 2022

(65) Prior Publication Data
US 2024/0039262 A1 Feb. 1, 2024

Related U.S. Application Data

(60) Provisional application No. 63/129,054, filed on Dec. 22, 2020.

(51) Int. Cl.
*H02G 3/18* (2006.01)
*H02G 3/08* (2006.01)
(52) U.S. Cl.
CPC ............. *H02G 3/185* (2013.01); *H02G 3/088* (2013.01)
(58) Field of Classification Search
CPC ............................... H02G 3/185; H02G 3/088
(Continued)

(56) References Cited

U.S. PATENT DOCUMENTS 1,159,005 A * 11/1915 Baldwin ................. F02M 7/22
261/DIG. 18
5,466,886 A * 11/1995 Lengyel ................ H02G 3/185
174/487
(Continued)

OTHER PUBLICATIONS

Hex Flange Serrated Cap Bolt Screws 18-8 Stainless Steel—10-24 x 2—Qty 25' (Raw Products Corp), Sep. 25, 2013 [online], retrieved from <https://www.amazon.com/flange-serrated-screws-stainless-steel/dp/B00FFE7RY8>.

(Continued)

*Primary Examiner* — Timothy J Thompson
*Assistant Examiner* — Michael F Mcallister
(74) *Attorney, Agent, or Firm* — KDW Firm PLLC

(57) ABSTRACT

An electrical floor box system is disclosed. The floor box is arranged and configured to enable an electrical component (e.g., outlet, switch, etc.) received therein to be positioned in any desired orientation so that the orientation of the electrical component can be adjusted as desired. In one embodiment, the electrical component is arranged and configured to be coupled to a mounting plate, which is arranged and configured to be seated within the floor box. In use, the mounting plate is freely adjustable (e.g., 360 degrees of adjustability) relative to the floor box. Once the electrical component has been properly positioned, the mounting plate may be secured to the floor box to secure a position of the mounting plate, and hence the electrical component. In addition, and/or alternatively, in one embodiment, the floor box is arranged and configured to receive various diameter conduits without the need for reducers, enlargers, etc.

24 Claims, 10 Drawing Sheets

(58) Field of Classification Search
USPC .......................................................... 174/50
See application file for complete search history.

(56) References Cited

U.S. PATENT DOCUMENTS

| | | | |
|---|---|---|---|
| 5,783,774 A * | 7/1998 | Bowman | H02G 3/185 |
| | | | 174/487 |
| 6,179,634 B1 | 1/2001 | Hull et al. | |
| 6,462,277 B1 | 10/2002 | Young | |
| 6,545,215 B2 | 4/2003 | Young | |
| 6,552,262 B2 | 4/2003 | English | |
| 6,612,081 B2 | 9/2003 | Cole | |
| 6,790,084 B1 | 9/2004 | Osborn, Jr. | |
| 6,854,226 B2 | 2/2005 | Cole | |
| 7,082,729 B2 | 8/2006 | Cole | |
| 7,193,160 B2 | 3/2007 | Dinh | |
| 7,388,164 B2 | 6/2008 | Scanzillo | |
| 7,795,544 B2 * | 9/2010 | Peck | H02G 3/185 |
| | | | 174/53 |
| 9,831,648 B1 | 11/2017 | Gretz | |
| 9,941,679 B1 | 4/2018 | Gretz | |
| 11,159,005 B1 * | 10/2021 | Baldwin | H02G 3/088 |
| 2009/0014196 A1 * | 1/2009 | Peck | H02G 3/185 |
| | | | 174/67 |
| 2009/0038842 A1 | 2/2009 | Peck | |

OTHER PUBLICATIONS

International Search Report and Written Opinion for the International Application No. PCT/US21/61096, mailed Jul. 1, 2022, 16 pages.

* cited by examiner

ADJUSTABLE FLOOR BOX

CROSS-REFERENCE TO RELATED APPLICATIONS

This application is a National Phase filing of International Application No. PCT/US2021/061096, filed Nov. 30, 2021, which application is a non-provisional of, and claims the benefit of the filing date of, U.S. Provisional Patent Application No. 63/129,054, filed Dec. 22, 2020, entitled "Adjustable Floor Box," each of which application is incorporated by reference herein in its entirety.

FIELD OF THE DISCLOSURE

The present disclosure relates generally to floor boxes, and more particularly to floor boxes installed in concrete floors, the floor boxes being arranged and configured to enable variable orientation of the electrical component (e.g., wiring device) received therein and/or to receive conduit of variable diameters.

BACKGROUND OF THE DISCLOSURE

The use of electrical junction boxes to accommodate electrical cable terminations is well known in the art. Generally speaking, electrical junction boxes house one or more electrical components or wiring devices, such as electrical receptacles, outlets, switches, data connectors, etc. The electrical junction boxes permit the electrical cables to either pass through or connect to the electrical components housed inside the electrical junction box. In certain applications, these electrical junction boxes are used in floor installations and may be received within a concrete floor, and thus are referred to as floor boxes. In use, electrical cable distribution takes place beneath the surface of the floor and the floor boxes are designed to be supported within a poured concrete floor.

Generally speaking, during building construction, prior to pouring the concrete floor, floor boxes are positioned and orientated to receive the power and/or data cables or wires. Thereafter, the floor boxes may be temporarily covered with a cap or cover. Next, the concrete floor may be poured. Later, installers (e.g., electricians) remove the cap or cover and use accessory components such as, for example, adapter plates or rings, receptacle plates, cups, fasteners, etc. to wire and install the electrical components within the floor box.

One common problem associated with floor boxes is the inability to adjust the orientation of the floor box after the concrete floor has been poured. For example, during initial installation, the orientation of the floor box may not have been properly aligned with one or more walls within a given area, which may be constructed at a later stage. As such, the electrical components installed therein may not be parallel or "square" with the surrounding walls, which may adversely affect the overall aesthetics of the room.

One current solution to this problem is to incorporate an adapter ring to couple the electrical component to the floor box to allow adjustment of the orientation of the electrical component relative to the floor box. However, conventional adapter rings utilize capturing features that limit the ability of an installer (e.g., electrician) to orient the electrical components. In addition, conventional adapter rings are typically secured to the floor box via an adhesive. As a result of the adhesive, subsequent serviceability and/or adjustability of the adapter ring relative to the floor box is limited.

In addition, floor boxes include one or more inlets/outlets to receive one or more conduits that carry the electrical wires or cables to and from the floor box. In use, the inlets/outlets are arranged and configured to receive a certain, predetermined diameter conduit. For one or more reasons, however, the diameter of the conduits may change during installation of the conduits and/or electrical cables but after the floor boxes have been installed. As a result, installers (e.g., electricians) may utilize one or more reducers or enlargers to couple the conduit to the inlet/outlet of the floor box (e.g., reducers may be used to transition from the larger diameter conduit to the smaller diameter inlets/outlets, enlargers may be used to transition from the smaller diameter conduit to the larger diameter inlets/outlets). In use, the reducers and/or enlargers may be, for example, glued to the inlet/outlet of the floor box and glued to the conduit.

It would be beneficial to provide a floor box that enables the orientation of the electrical component to be freely adjustable in any desired orientation regardless of the orientation of the floor box (e.g., 360 degrees of adjustment). In addition, and/or alternatively, it would be beneficial to provide a floor box that enables the floor box to receive various sized conduits without the use of additional couplers (e.g., reducers, enlargers, etc.).

It is with respect to these and other considerations that the present improvements may be useful.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Disclosed herein is a floor box arranged and configured for use within a concrete poured floor. In one embodiment, the floor box is arranged and configured to enable the installer (e.g., electrician) to orient (e.g., rotate) the received electrical component (e.g., electrical outlet, switch, etc.) in any desired orientation (e.g., the floor box system is arranged and configured to provide 360 degrees of adjustability so that the electrical component can be orientated in any position regardless of the orientation of the floor box). In one embodiment, the electrical component is arranged and configured to be coupled to a mounting plate, which is arranged and configured to be seated within the floor box. In use, the mounting plate is freely adjustable relative to the floor box. Once the electrical component has been properly positioned, the mounting plate may be secured to the floor box to secure a position of the mounting plate, and hence the electrical component, relative to the floor box. In one embodiment, the mounting plate may be secured to the floor box via a plurality of fasteners arranged and configured to compress the mounting plate relative to the floor box.

In addition, and/or alternatively, in one embodiment, the floor box is arranged and configured to receive various diameter conduits without the need for reducers, enlargers, etc.

In one embodiment, an electrical floor box assembly is disclosed. The electrical floor box assembly comprising a floor box, an adapter ring, and a mounting plate. The floor box including a top end, a bottom end, an outer body, an interior cavity extending from the top end thereof, and a plurality of inlets/outlets, each inlet/outlet arranged and configured to receive a conduit. The adapter ring arranged and configured to be secured at least partially within the interior cavity of the floor box, the adapter ring including an interior cavity and a seating surface positioned within the interior cavity of the adapter ring. The mounting plate for securing a wiring device, the mounting plate including a seating surface, the mounting plate seating surface arranged and configured to be rotatably received by the adapter ring seating surface when the mounting plate is positioned at least partially within the interior cavity of the adapter ring. In a first unfastened state, the mounting plate is rotatable relative to the adapter ring. In a second fastened state, the mounting plate is secured relative to the adapter ring.

In one embodiment, the adapter ring seating surface is defined by a stepped bore, the stepped bore including first and second diameters at top and bottom ends of the adapter ring, respectively.

In one embodiment, the mounting plate includes a ledge extending from a top end thereof, the ledge defining the mounting plate seating surface.

In one embodiment, the mounting plate seating surface rests on the adapter plate seating surface when the mounting plate is positioned at least partially within the interior cavity of the adapter ring.

In one embodiment, in the first unfastened state, the mounting plate is arranged and configured to be rotatable by 360 degrees relative to the adapter ring.

In one embodiment, the electrical floor box assembly further comprises a fastener, the fastener arranged and configured to threadably engage the adapter ring so that tightening the fastener engages the mounting plate to transition the electrical floor box assembly from the first unfastened state to the second fastened state.

In one embodiment, the mounting plate includes a perimeter and the fastener includes a fastener head having a bearing surface, wherein the fastener is positioned to engage the mounting plate adjacent to the perimeter of the mounting plate.

In one embodiment, the fastener includes a plurality of fasteners wherein each of the plurality of fasteners includes a fastener head having a bearing surface, wherein the plurality of fasteners are each positioned to engage the mounting plate adjacent to the perimeter of the mounting plate.

In one embodiment, each of the plurality of fasteners include a fastener head, having a textured bearing surface.

In one embodiment, the electrical floor box assembly further comprises a seal positionable between the mounting plate seating surface and the adapter ring seating surface.

In one embodiment, the adapter ring seating surface and the mounting plate seating surface each include a plurality of serrations.

In one embodiment, the plurality of inlets/outlets include a borehole including a first portion and a second portion, the first portion having a first diameter arranged and configured to receive a first conduit having a first diameter, the second portion having a second diameter arranged and configured to receive a second conduit having a second diameter, the second diameter being smaller than the first diameter.

In one embodiment, the first and second portions are coaxially arranged.

In one embodiment, the first and second portions are separated by a stepped surface.

In one embodiment, the inlets/outlets are arranged and configured to protrude at least partially into the interior cavity of the floor box.

In an alternate embodiment, an electrical floor box assembly is disclosed. The electrical floor box assembly including a floor box including a top end, a bottom end, an outer body, an interior cavity extending from the top end thereof, and a plurality of inlets/outlets. The plurality of inlets/outlets include a borehole including a first portion and a second portion, the first portion having a first diameter arranged and configured to receive a first conduit having a first diameter, the second portion having a second diameter arranged and configured to receive a second conduit having a second diameter, the second diameter being smaller than the first diameter.

In one embodiment, the first and second portions are coaxially arranged.

In one embodiment, the first and second portions are separated by a stepped surface.

In one embodiment, the inlets/outlets are arranged and configured to protrude at least partially into the interior cavity of the floor box.

In one embodiment, the electrical floor box assembly further comprises an adapter ring and a mounting plate. The adapter ring arranged and configured to be secured at least partially within the interior cavity of the floor box, the adapter ring including an interior cavity and a seating surface positioned within the interior cavity of the adapter ring. The mounting plate for securing a wiring device, the mounting plate including a seating surface, the mounting plate seating surface arranged and configured to be rotatably received by the adapter ring seating surface when the mounting plate is positioned at least partially within the interior cavity of the adapter ring. In a first unfastened state, the mounting plate is rotatable relative to the adapter ring. In a second fastened state, the mounting plate is secured relative to the adapter ring.

In one embodiment, the adapter ring seating surface is defined by a stepped bore, the stepped bore including first and second diameters at top and bottom ends of the adapter ring, respectively.

In one embodiment, the mounting plate includes a ledge extending from a top end thereof, the ledge defining the mounting plate seating surface.

In one embodiment, the mounting plate seating surface rests on the adapter plate seating surface when the mounting plate is positioned at least partially within the interior cavity of the adapter ring.

In one embodiment, in the first unfastened state, the mounting plate is arranged and configured to be rotatable by 360 degrees relative to the adapter ring.

In one embodiment, the electrical floor box assembly further comprises a fastener, the fastener arranged and configured to threadably engage the adapter ring so that tightening the fastener engages the mounting plate to transition the electrical floor box assembly from the first unfastened state to the second fastened state.

In one embodiment, the mounting plate includes a perimeter and the fastener includes a fastener head having a bearing surface, wherein the fastener is positioned to engage the mounting plate adjacent to the perimeter of the mounting plate.

In one embodiment, the fastener includes a plurality of fasteners wherein each of the plurality of fasteners includes a fastener head having a bearing surface, wherein the plurality of fasteners are each positioned to engage the mounting plate adjacent to the perimeter of the mounting plate.

In one embodiment, the plurality of fasteners each include a fastener head having a textured bearing surface.

In one embodiment, the electrical floor box assembly further comprises a seal positioned between the mounting plate seating surface and the adapter ring seating surface.

In one embodiment, the adapter ring seating surface and the mounting plate seating surface each include a plurality of serrations.

In an alternate embodiment, an electrical floor box assembly is disclosed. The electrical floor box assembly comprising a floor box, an adapter ring, and a mounting plate. The floor box including a top end, a bottom end, an outer body, an interior cavity extending from the top end thereof, and a plurality of inlets/outlets, each inlet/outlet arranged and configured to receive a conduit. The adapter ring arranged and configured to be secured at least partially within the interior cavity of the floor box, the adapter ring including an interior cavity and a seating surface positioned within the interior cavity of the adapter ring. The mounting plate for securing a wiring device, the mounting plate including a seating surface, the mounting plate seating surface arranged and configured to be rotatably received by the adapter ring seating surface when the mounting plate is positioned at least partially within the interior cavity of the adapter ring. In a first unfastened state, the mounting plate is rotatable relative to the adapter ring. In a second fastened state, the mounting plate is secured relative to the adapter ring. The plurality of inlets/outlets include a borehole including a first portion and a second portion, the first portion having a first diameter arranged and configured to receive a first conduit having a first diameter, the second portion having a second diameter arranged and configured to receive a second conduit having a second diameter, the second diameter being smaller than the first diameter.

BRIEF DESCRIPTION OF THE DRAWINGS

By way of example, a specific embodiment of the disclosed device will now be described, with reference to the accompanying drawings, in which.

Figure 1:
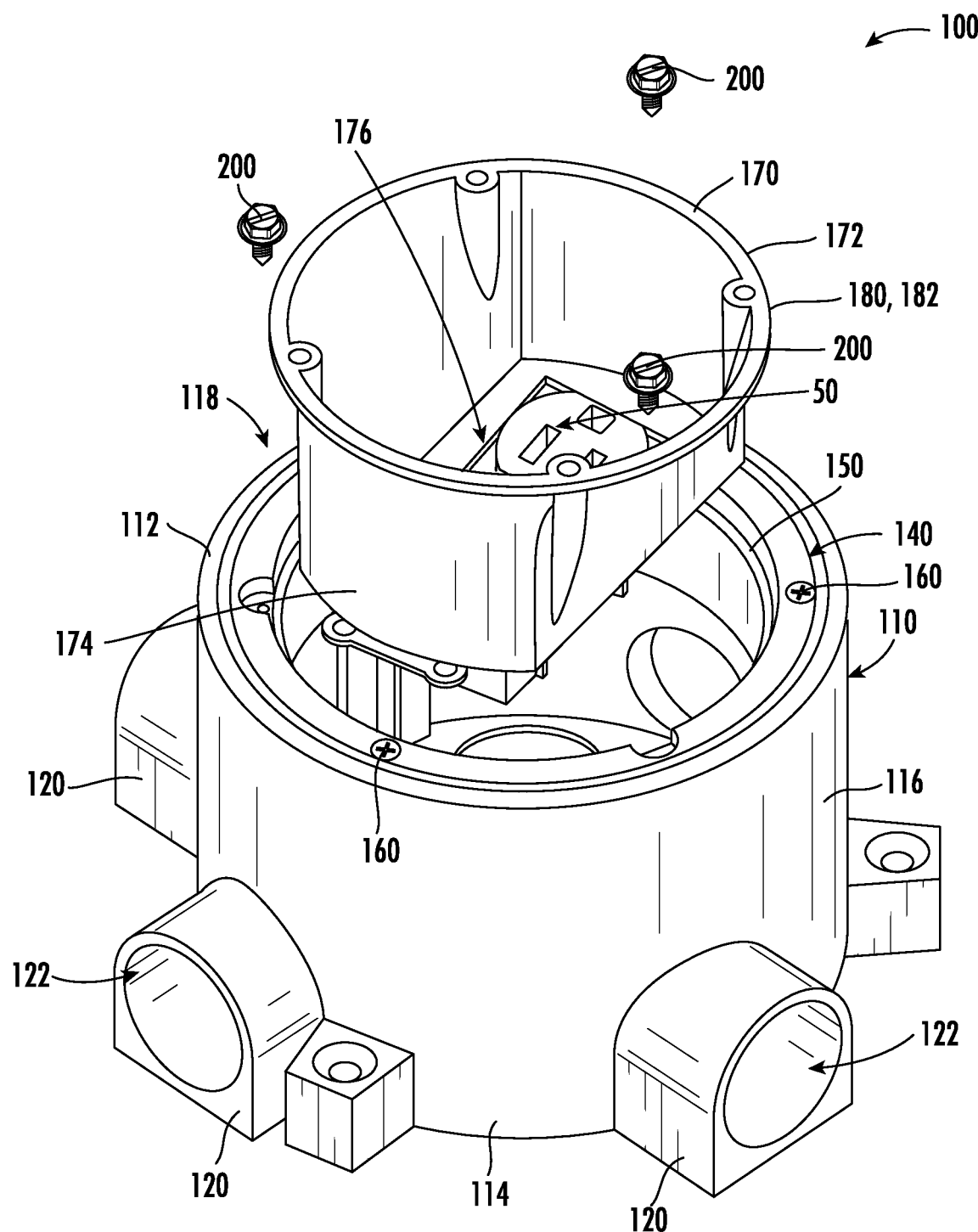
FIG. 1 is a perspective, partially exploded view of an embodiment of a floor box assembly according to one or more features of the present disclosure.

The drawings are not necessarily to scale. The drawings are merely representations, not intended to portray specific parameters of the disclosure. The drawings are intended to depict example embodiments of the disclosure, and therefore are not to be considered as limiting in scope. In the drawings, like numbering represents like elements.

DETAILED DESCRIPTION

Numerous embodiments of floor boxes, floor box assemblies, floor box systems, etc. arranged and configured to be installed in concrete floors will now be described more fully hereinafter with reference to the accompanying drawings, in which preferred embodiments of the present disclosure are presented. In accordance with one or more features of the present disclosure, the floor boxes, floor box assemblies, floor box systems, etc. include one or more mechanisms or systems arranged and configured to enable variable orientation (e.g., positioning, alignment, etc.) of the electrical components or wiring devices (terms used interchangeably herein without the intent to limit) received therein and/or one or more mechanisms or systems arranged and configured to enable receipt of various sized diameter conduits without the need for incorporating intermediate couplers such as, for example, reducers, enlargers, etc. In use, the floor boxes, floor box assemblies, floor box systems, etc. may, however, be embodied in many different forms and should not be construed as being limited to the embodiments set forth herein. Rather, these embodiments are provided so that this disclosure will convey certain example features to those skilled in the art.

Referring to FIGS. 1-3B, an embodiment of a floor box assembly or system 100 is disclosed. In use, as will be described in greater detail herein, the floor box system 100 includes a floor box 110 such as, for example, a concrete floor box arranged and configured to be positioned within a concrete floor. As illustrated, the floor box 110 includes a top end 112, a bottom end 114, an outer body 116, an interior cavity 118 extending from the top end 112 thereof, and a plurality of inlets/outlets 120 arranged and configured to receive conduit 60 such as, for example, conduit 60A, 60B as will be described in greater detail below in connection with FIGS. 8C-9B). Each inlet/outlet 120 includes a bore hole 122 in communication with the interior cavity 118. As will be appreciated by one of ordinary skill in the art, the conduit 60 is arranged and configured to carry, house, etc. cables such as, electrical cables, data cables, etc., to and from the floor box 110. Thus arranged, the cables can be operatively coupled to the electrical component 50 (e.g., outlet, switch, data connector, etc.) received within the interior cavity 118 of the floor box 110. While the present disclosure will be described and illustrated in connection with a particular floor box, it should be appreciated that the features of the present disclosure made be used in conjunction with any suitable floor box now known or hereafter developed. As such, the present disclosure should not be limited to any particular floor box unless explicitly claimed.

As illustrated, in one embodiment, the floor box system 100 may include an adapter ring, member, plate, etc. 140 and a mounting ring, member, plate, etc. 170 (terms ring, member, and plate used interchangeably without the intent to limit or distinguish). In use, the adapter ring 140 is arranged and configured to be positioned within the interior cavity 118 of the floor box 110. For example, as illustrated, the adapter ring 140 may include a circular outer profile or body portion 142 (FIG. 2) arranged and configured to be received within the interior cavity 118 of the floor box 110. In addition, as illustrated, the adapter ring 140 may be coupled to the floor box 110 via one or more fasteners 160, although other mechanisms and methods for coupling the adapter ring 140 to the floor box 110 are envisioned such as, for example, an adhesive.

Figure 2:
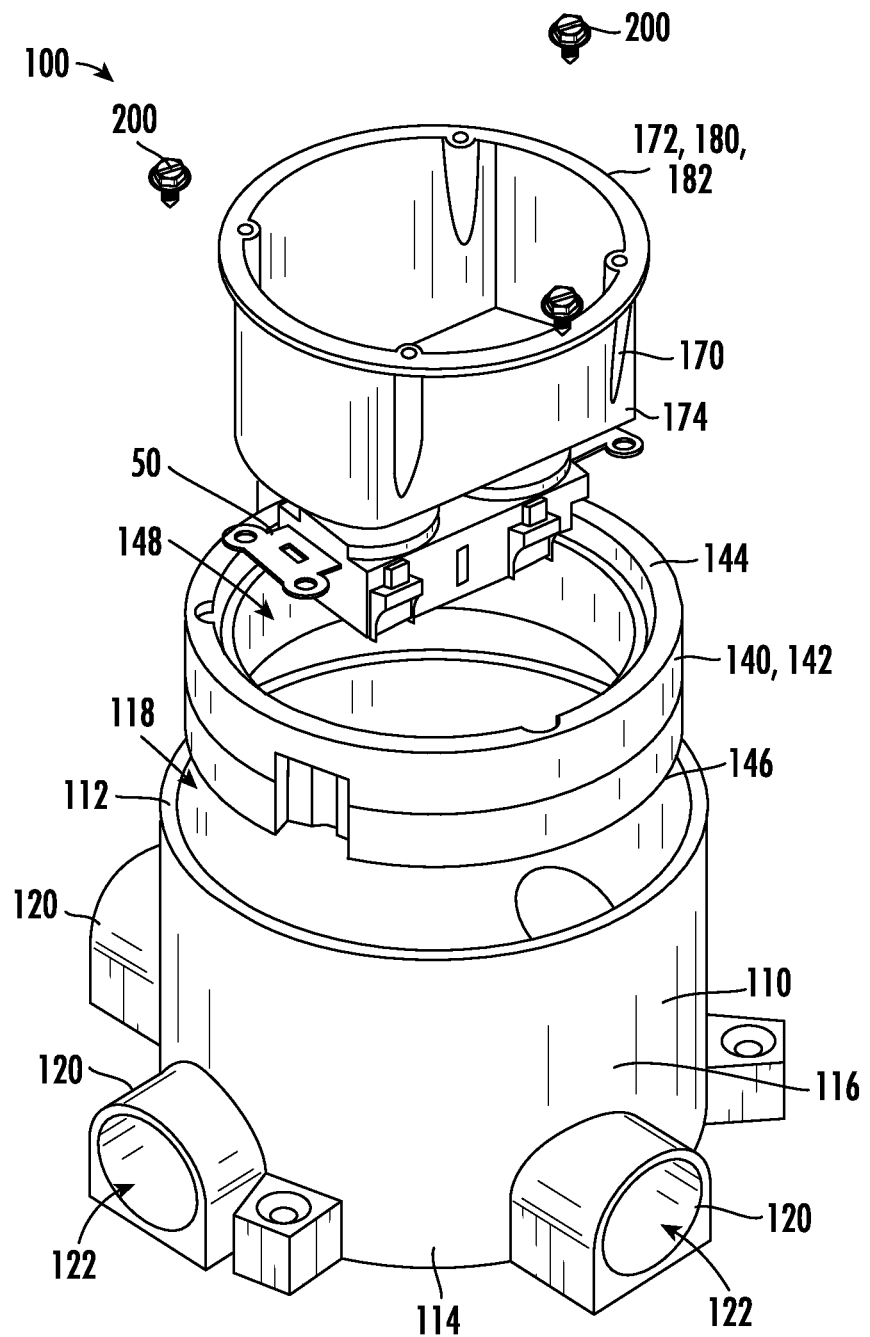
FIG. 2 is a perspective, exploded view of the floor box assembly shown in FIG. 1.
Figures 3A, 3B:
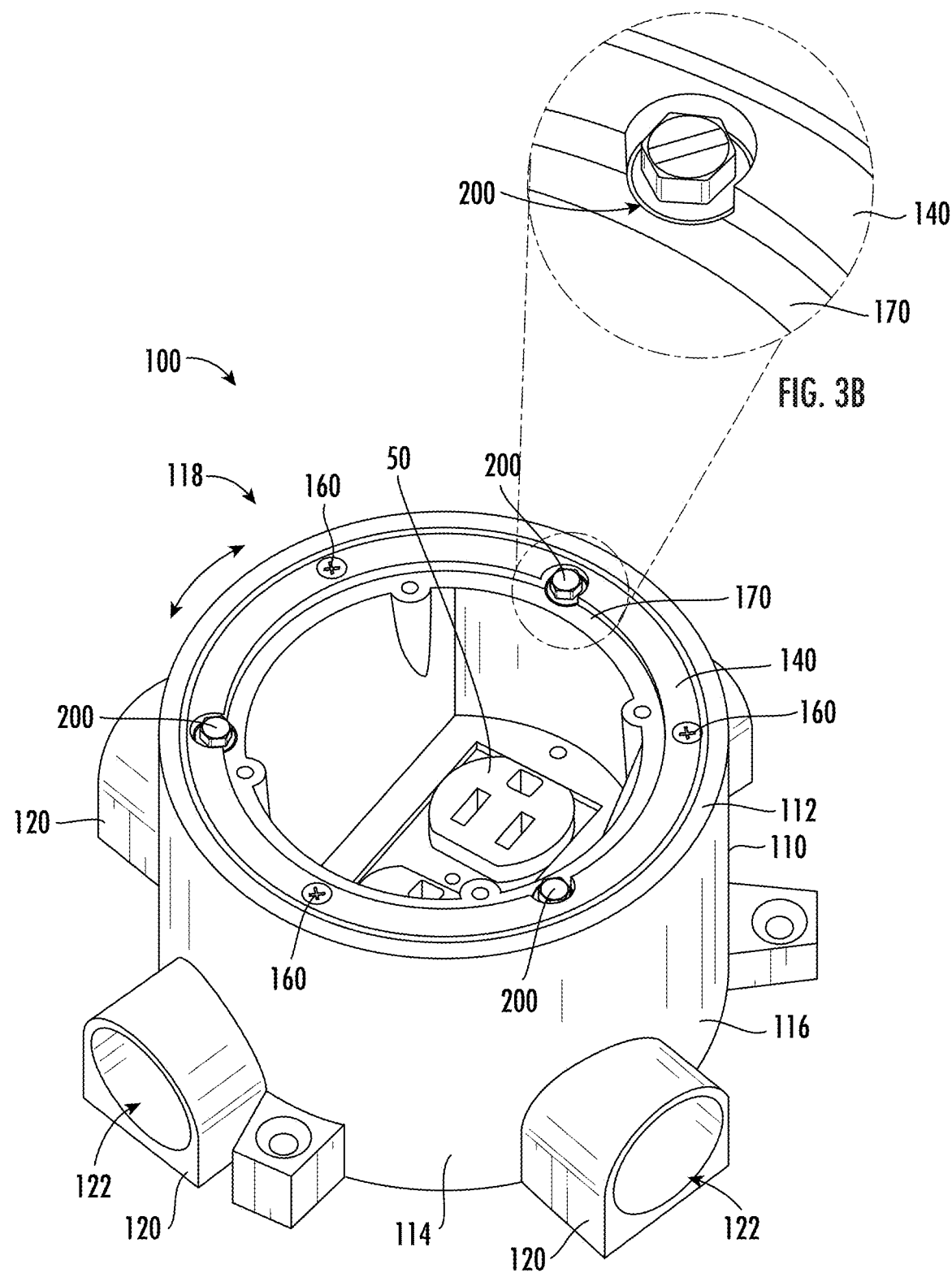
FIG. 3A is a perspective view of the floor box assembly shown in FIG. 1.
FIG. 3B is a detailed view of a portion of the floor box assembly shown in FIG. 3A.

In accordance with one or more features of the present disclosure, the adapter ring 140 includes a seating surface 150 arranged and configured to contact, support, etc. the mounting plate 170. For example, as illustrated in FIG. 2, in one embodiment, the adapter ring 140 may include a top end 144 and a bottom end 146 opposite thereof. In use, the top end 144 may define a first portion including a first cross-section width or diameter, while the bottom end 146 may define a second portion including a second cross-section width or diameter. The second cross-section width or diameter may be smaller than the first cross-section width or diameter so that a ledge or seating surface 150 is defined within an interior cavity 148 of the adapter ring 140 (e.g., the seating surface 150 of the adapter ring 140 defines a stepped bore including first and second diameters at top and bottom ends of the adapter ring, respectively).

The mounting plate 170 is arranged and configured to be positioned within the interior cavity 148 of the adapter ring 140. In addition, the mounting plate 170 is arranged and configured to receive, couple to, etc. the electrical component 50. For example, in one embodiment, the mounting plate 170 includes a top end 172 and a bottom end 174 opposite thereof. In use, the bottom end 174 includes an opening 176 arranged and configured to receive the electrical component 50. The top end 172 includes a circular outer profile arranged and configured to be received within the interior cavity 148 of the adapter ring 140. For example, the top end 172 may include a ledge 180 defining a seating surface 182 of the mounting plate 170.

In use, with the mounting plate 170 positioned within the interior cavity 148 of the adapter ring 140, the mounting plate 170 is arranged and configured to be positioned on (e.g., sit on, rest on, etc.) the seating surface 150 of the adapter ring 140. For example, in one embodiment, the ledge or seating surface 180, 182 of the mounting plate 170 is arranged and configured to be seated on the seating surface 150 of the adapter ring 140. Thus arranged, in use, the mounting plate 170 can be freely movably positioned relative to the adapter ring 140 so that the electrical component 50 coupled to the mounting plate 170 can be freely movably positioned relative to the floor box 110, which is coupled to the adapter ring 140 (e.g., the mounting plate 170, and hence the electrical component 50, can be freely rotated relative to the adapter plate 140, and hence the floor box 110 so that the electrical component 50 can be aligned, positioned, etc. as desired).

Figure 7:
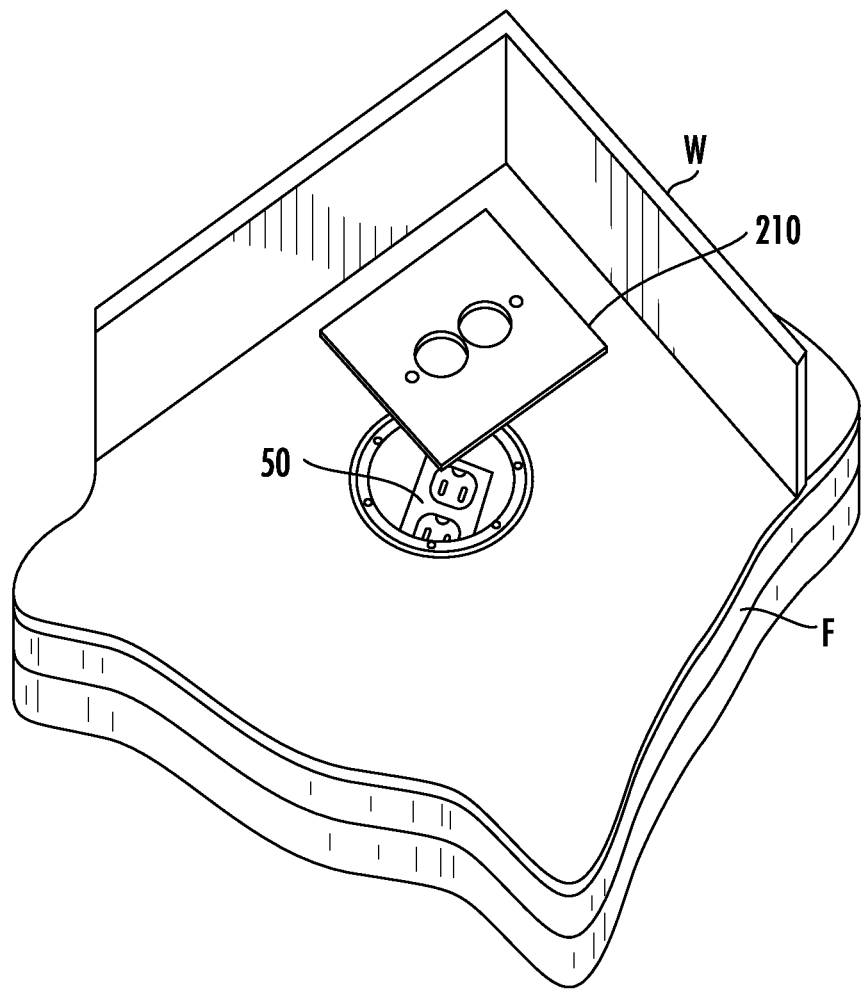
FIG. 7 is a perspective, top view of a floor box assembly according to one or more features of the present disclosure, the floor box assembly positioned within a floor and adjacent to one or more walls of a building.

In this manner, referring to FIG. 7, the position or alignment of the electrical component 50 positioned within the floor box system 100, which is positioned within the concrete floor F, can be properly aligned with, for example, an outer wall W by moveably positioning or rotating the mounting plate 170 relative to the adapter ring 140. That is, in accordance with the features of the present disclosure, contrary to known floor box systems, the mounting plate 170 is able to freely rotate 360 degrees relative to the adapter ring 140 thus enabling limitless rotational positioning of the mounting plate 170, and hence the electrical component 50, relative to the adapter ring 140, and hence the floor box 110.

Figure 4:
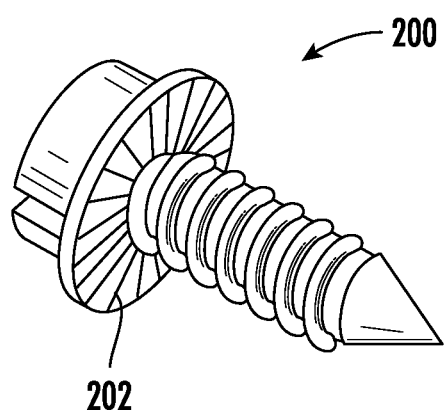
FIG. 4 is a perspective view of an embodiment of a screw or fastener that may be used in connection with the floor box assembly shown in FIG. 1, the screw or fastener including a textured undersurface.

Once the electrical component 50 is properly positioned or orientated, the position of the mounting plate 170 may be secured relative to the position of the adapter ring 140 thus securing the position of the electrical component 50 relative to the floor box 110. In use, the position of the mounting plate 170 may be secured relative to the position of the adapter ring 140 by any suitable mechanism or method now known or hereafter developed. For example, referring to FIGS. 1-4, in one embodiment, one or more screws or fasteners 200 may be used to secure the mounting plate 170 to the adapter ring 140. As illustrated in FIG. 4, the screw or fastener 200 may include a textured bottom surface 202 (e.g., a textured bearing surface) to enhance gripping to the top surface of the mounting plate 170. In use, in one embodiment, tightening of the screws or fasteners 200 engages or compresses the mounting plate 170 relative to the adapter ring 140 thereby preventing, or at least inhibiting, rotation of the mounting plate 170 relative to the adapter ring 140 (e.g., compresses the seating surface 182 of the mounting plate 170 onto the seating surface 150 of the adapter ring 140). In addition, if necessary, by loosening or removing the fasteners or screws 200, the position of the mounting plate 170 can be adjusted relative to the adapter ring 140. Thus arranged, in use, with the screw or fastener 200 in a first or unfastened state or position, the mounting plate 170 is freely rotatable relative to the adapter plate 140. Thereafter, tightening of the screw or fastener 200 to a second or fastened state or position, fixedly secures the position of the mounting plate 170 relative to the adapter plate 140. As illustrated, in one embodiment, the mounting plate 170 includes a perimeter and the fasteners 200 are positioned to engage the mounting plate 170 adjacent to the perimeter of the mounting plate 170.

Once the position of the electrical component 50 coupled to the mounting plate 170 has been positioned as desired and the screw or fasteners 200 have been tightened to secure the position of the mounting plate 170, and hence the electrical component 50, relative to the adapter ring 140, a cover plate 210 (FIG. 7) may be coupled to, for example, the mounting plate 170 using one or more fasteners.

Figure 5:
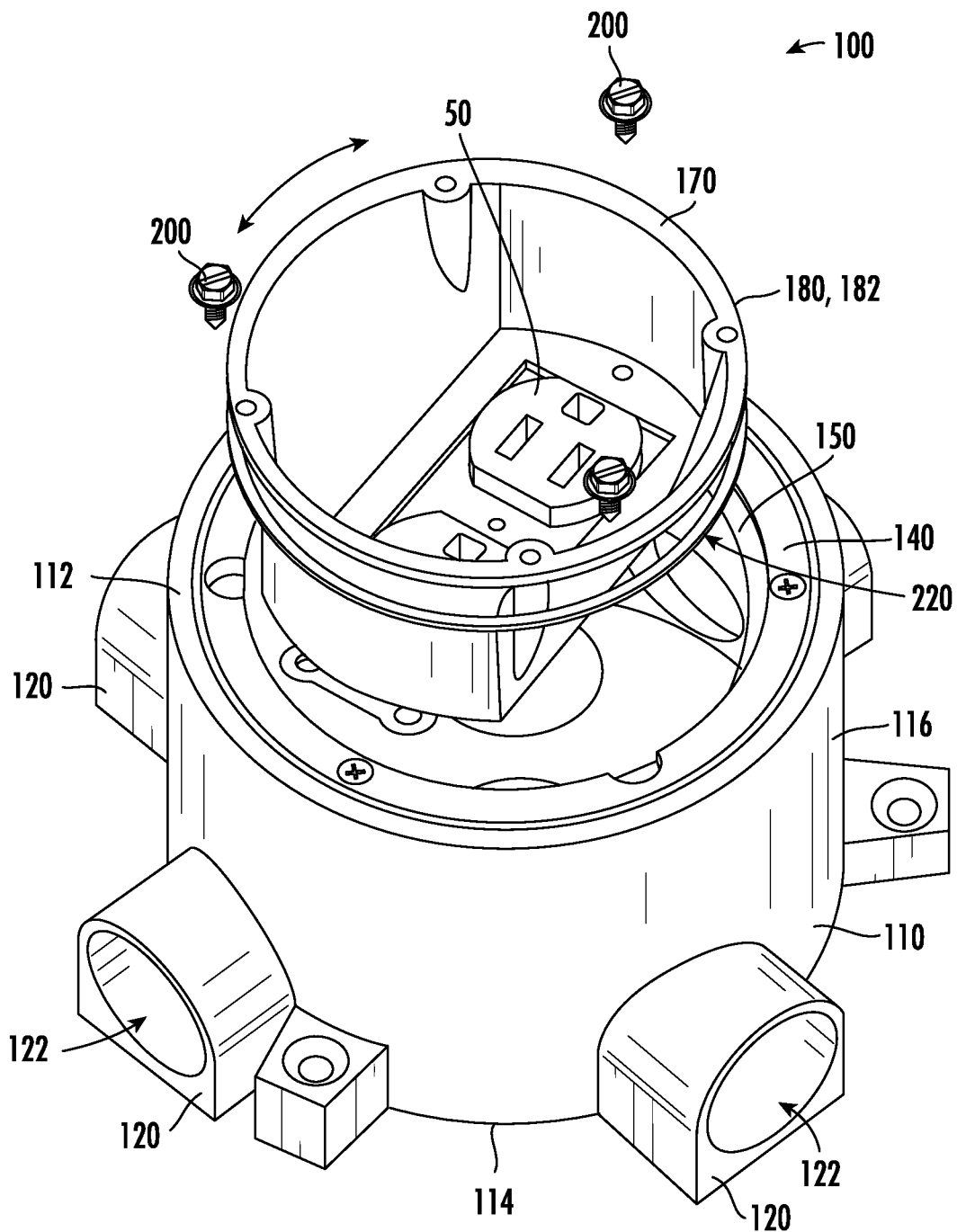
FIG. 5 is a perspective, partially exploded view of an alternate embodiment of a floor box assembly according to one or more features of the present disclosure.
Figure 6A:
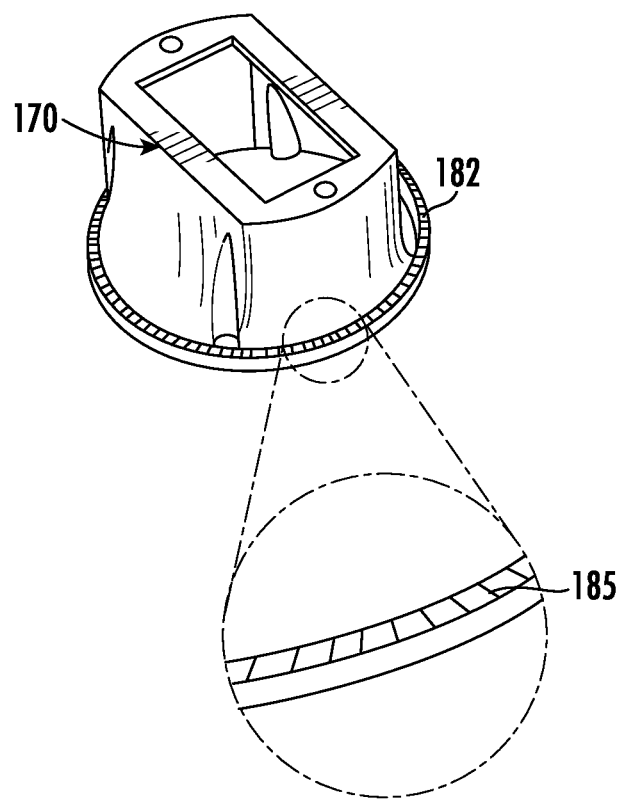
FIG. 6A is a perspective, bottom view of an alternate embodiment of a mounting plate that may be used in connection with a floor box assembly according to one or more features of the present disclosure.
Figure 6B:
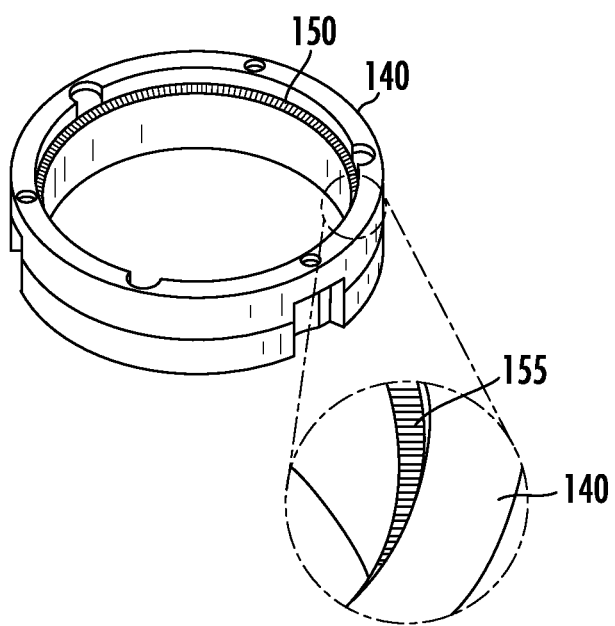
FIG. 6B is a perspective, top view of an alternate embodiment of an adapter ring that may be used in connection with the mounting plate shown in FIG. 6A.

In one or more embodiments, the floor box system 100 may also include one or more features to facilitate enhanced coupling between the seating surfaces 150, 182 of the adapter ring 140 and the mounting plate 170. For example, referring to FIG. 5, in one embodiment, the floor box system 100 may also include a seal 220 positioned between the seating surfaces 150, 182 of the adapter ring 140 and the mounting plate 170. The seal 220 may be manufactured from any suitable material now known or hereafter developed. For example, the seal 220 may be manufactured from an elastomer material, a silicon, etc. Thus arranged, in use, the seal 220 provides increased grip between the mounting plate 170 and the adapter ring 140 while also protecting the interior of the floor box system 100 from moisture incursion. Alternatively, referring to FIGS. 6A and 6B, in one embodiment, the seating surfaces 150, 182 of the adapter ring 140 and the mounting plate 170 may each include a plurality of ridges or serrations 155, 185. Thus arranged, in use, the plurality of serrations 155, 185 mate with each other to prevent, or at least inhibit, unintended or unwanted rotation of the mounting plate 170 relative to the adapter ring 140 once the fasteners 200 are tightened.

In accordance with one or more separate and distinct features of the present disclosure that may be used separately from, or in combination with, the adjustable orientation feature described above, the inlet/outlets 120 of the floor box 110 may be arranged and configured to receive various sized diameter conduits 60 (e.g., the inlets/outlets 120 of the floor box 110 may be arranged and configured to accommodate different diameters of conduits typically used in concrete flooring). Thus arranged, in use, installers (e.g., electricians) can couple conduits of different diameters to the floor box 110 without requiring additional intermediate components such as, for example, reducers, enlargers, etc. Thus arranged, the floor boxes 110 facilitate easier installation by minimizing labor, additional parts, and minimizing the gluing process.

Referring to FIGS. 8A-8D, in one embodiment, the inlet/outlets 120 may include a borehole 122 including a plurality of diameters for receiving a conduit of different diameters. As illustrated, the borehole 122 may include a first portion 230 having a first diameter $D_1$ arranged and configured to receive a conduit 60A having a first diameter and a second portion 240 having a second diameter $D_2$ arranged and configured to receive a conduit 60B having a second diameter (e.g., the borehole 122 may include a first inner borehole or portion 230 having a first diameter $D_1$ arranged and configured to receive a conduit 60A having a first diameter and a second inner borehole or portion 240 having a second diameter $D_2$ arranged and configured to receive a conduit 60B having a second diameter). The second diameter $D_2$ can be smaller than the first diameter $D_1$. As illustrated, in one embodiment, the first and second portions 230, 240 are coaxially arranged.

Thus arranged, as illustrated, the inlets/outlets 120 include coaxial first and second diameters $D_1$, $D_2$ so that first and second diameter conduits 60A, 60B can be received within the same inlet/outlet 120. In use, the different sized conduits 60A, 60B can be slideably inserted into the inlets/outlets 120 to different depths (e.g., as will be described in greater detail below, the smaller diameter conduit 60B can be inserted to a greater extent than the larger diameter conduit 60A). While the inlets/outlets 120 of the floor boxes 110 of the present disclosure will be described and illustrated with first and second diameters, it should be understood that the present disclosure is not so limited and that more than two diameters may be utilized including, for example, three, four, or more.

Figure 8A:
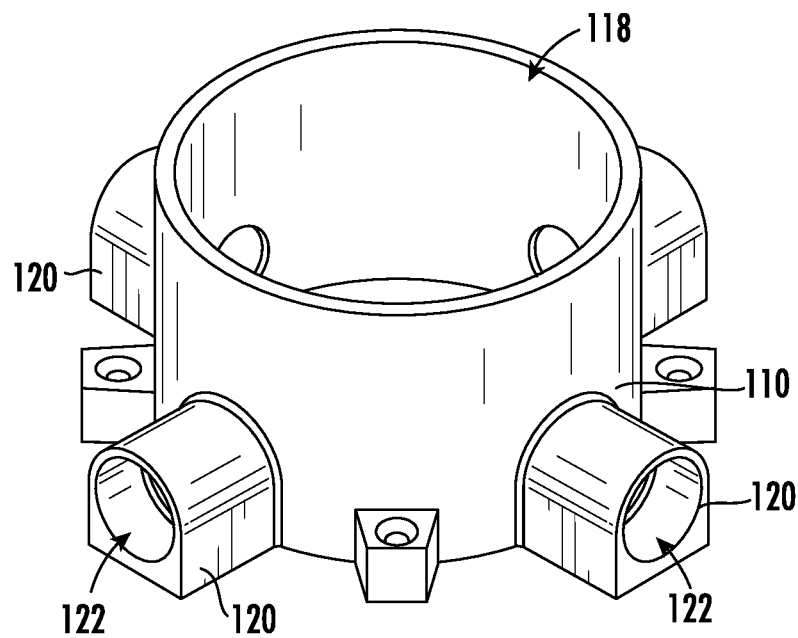
FIG. 8A is a perspective, top view of an embodiment of a floor box according to one or more features of the present disclosure.
Figure 8B:
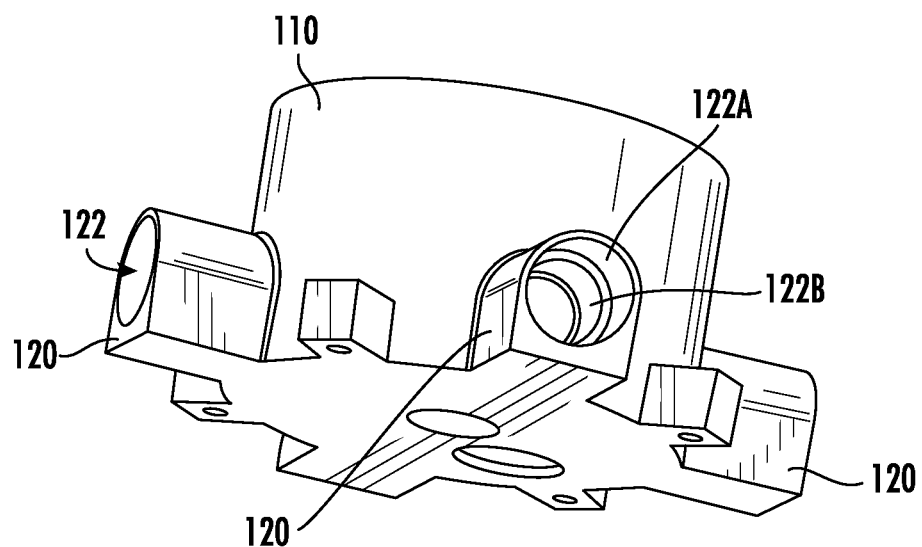
FIG. 8B is a perspective, bottom view of the floor box shown in FIG. 8A.
Figure 8C:
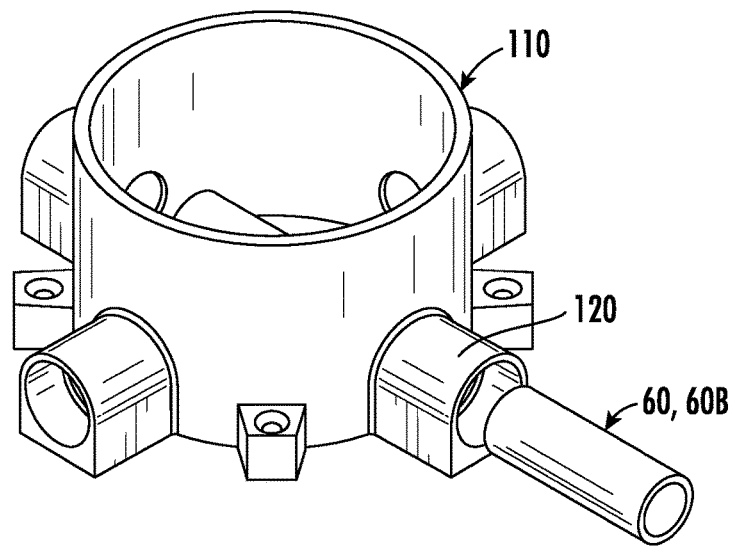
FIG. 8C is an alternate perspective, top view of the floor box shown in FIG. 8A.
Figure 8D:
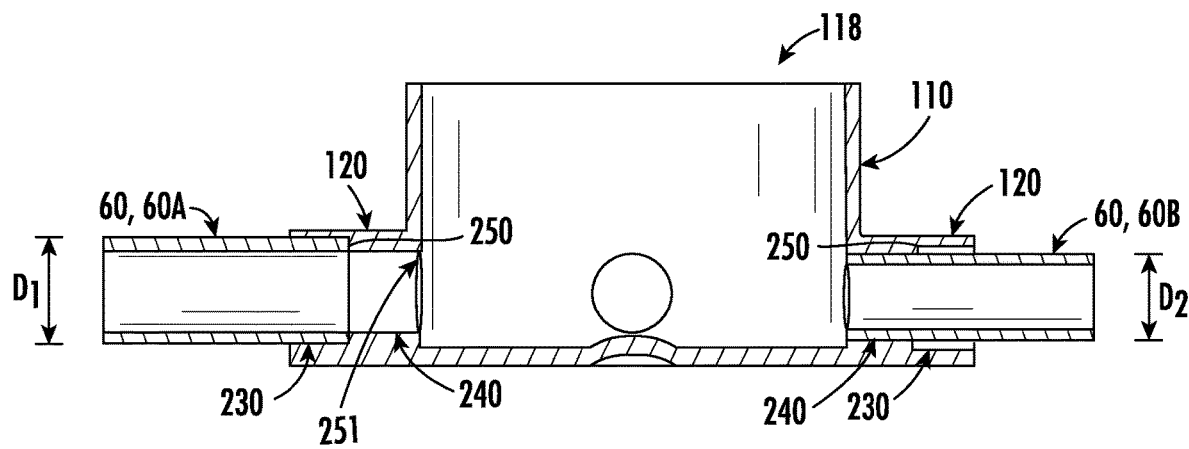
FIG. 8D is a cross-sectional view of the floor box shown in FIG. 8A.
Figure 9A:
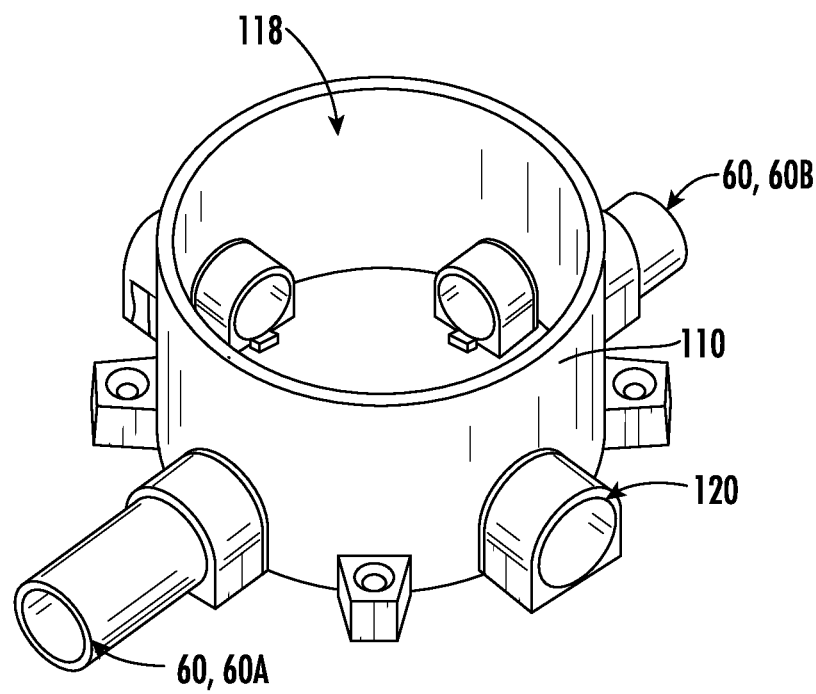
FIG. 9A is a perspective, top view of an alternate embodiment of a floor box according to one or more features of the present disclosure.
Figure 9B:
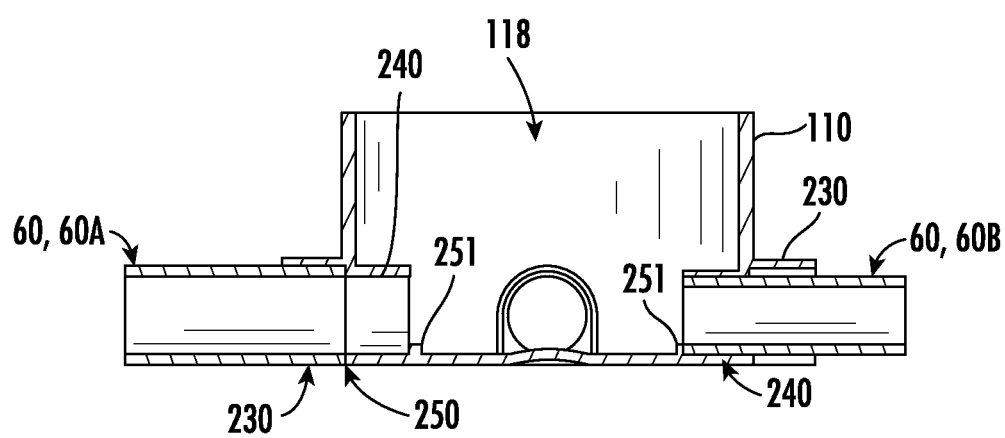
FIG. 9B is a cross-sectional view of the floor box shown in FIG. 9A.

In one embodiment, the first and second portions 230, 240 are separated by a stop or stepped surface 250. That is, the inlet/outlet 120 includes a stop 250 formed between the larger diameter first portion 230 and the smaller diameter second portion 240. Thus arranged, in use and as best shown in FIG. 8D, the larger diameter conduit 60A can be inserted into the first portion 230 of the inlet/outlet 120 (e.g., first inner borehole). The larger diameter conduit 60A can be slideably inserted until an end of the larger diameter conduit 60A contacts the stop 250 between the first and second portions 230, 240. In addition, the smaller diameter conduit 60B can be inserted through the larger diameter first portion 230 and into the smaller diameter second portion 240 (e.g., second inner borehole). The smaller diameter conduit 60B may be slideably inserted until an end of the smaller diameter conduit 60B contacts a second stop 251 to prevent the smaller diameter conduit 60B from overextending into the interior cavity 118 of the floor box 110.

In this manner, the inlet/outlet 120 is arranged and configured to receive multiple diameter conduits without the need for using couplers such as, for example, reducers or enlargers, to transition between a smaller diameter inlet/outlet and a larger diameter conduit, or vice-versa.

Once properly positioned, the conduit 60 can be securely coupled to the inlet/outlet 120 of the floor box 110 using, for example, an adhesive.

Referring to FIGS. 8A-8D, in one embodiment, the inlets/outlets 120 may be arranged and configured to extend from the outer body 116 of the floor box 110 and may be positioned adjacent to the bottom end 114 of the floor box 110. However, alternate embodiments and/or configurations are envisioned. For example, referring to FIGS. 9A-9B, the inlet/outlet 120 may be arranged and configured to protrude into the interior cavity 118 of the floor box 110.

While the present disclosure makes reference to certain embodiments, numerous modifications, alterations, and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more embodiments for the purpose of streamlining the disclosure. However, it should be understood that various features of the certain embodiments of the disclosure may be combined in alternate embodiments. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The phrases "at least one", "one or more", and "and/or", as used herein, are open-ended expressions that are both conjunctive and disjunctive in operation. The terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. All rotational references describe relative movement between the various elements. Identification references (e.g., primary, secondary, first, second, third, fourth, etc.) are not intended to connote importance or priority, but are used to distinguish one feature from another. The drawings are for purposes of illustration only and the dimensions, positions, order and relative to sizes reflected in the drawings attached hereto may vary.

What is claimed is:

1. An electrical floor box assembly, comprising:
a floor box including a top end, a bottom end, an outer body, an interior cavity extending from the top end thereof, and a plurality of inlets/outlets, each inlet/outlet arranged and configured to receive a conduit;
an adapter ring arranged and configured to be secured at least partially within the interior cavity of the floor box, the adapter ring including an interior cavity and a seating surface positioned within the interior cavity of the adapter ring; and
a mounting plate for securing a wiring device, the mounting plate including a seating surface, the mounting plate seating surface arranged and configured to be rotatably received by the adapter ring seating surface when the mounting plate is positioned at least partially within the interior cavity of the adapter ring;
wherein in a first unfastened state, the mounting plate is rotatable relative to the adapter ring and, in a second fastened state, the mounting plate is secured relative to the adapter ring; and
a fastener arranged and configured to threadably engage the adapter ring so that tightening the fastener engages the mounting plate to transition the electrical floor box assembly from the first unfastened state to the second fastened state.

2. The electrical floor box assembly of claim 1, wherein the adapter ring seating surface is defined by a stepped bore, the stepped bore including first and second diameters at top and bottom ends of the adapter ring, respectively.

3. The electrical floor box assembly of claim 1, wherein the mounting plate includes a top end and a ledge extending from the top end of the mounting plate, the ledge defining the mounting plate seating surface.

4. The electrical floor box assembly of claim 1, wherein the mounting plate seating surface rests on the adapter plate seating surface when the mounting plate is positioned at least partially within the interior cavity of the adapter ring.

5. The electrical floor box assembly of claim 1, wherein in the first unfastened state, the mounting plate is arranged and configured to be rotatable by 360 degrees relative to the adapter ring.

6. The electrical floor box assembly of claim 1, wherein the mounting plate includes a perimeter and the fastener includes a fastener head having a bearing surface, wherein the fastener is positioned to engage the mounting plate adjacent to the perimeter of the mounting plate.

7. The electrical floor box assembly of claim 6, wherein the fastener includes a plurality of fasteners each positioned to engage the mounting plate adjacent to the perimeter of the mounting plate.

8. The electrical floor box assembly of claim 7, wherein each of the fastener head of the plurality of fasteners include a textured bearing surface.

9. The electrical floor box assembly of claim 1, further comprising a seal positionable between the mounting plate seating surface and the adapter ring seating surface.

10. An electrical floor box assembly, comprising:
a floor box including a top end, a bottom end, an outer body, an interior cavity extending from the top end thereof, and a plurality of inlets/outlets, each inlet/outlet arranged and configured to receive a conduit;
an adapter ring arranged and configured to be secured at least partially within the interior cavity of the floor box, the adapter ring including an interior cavity and a seating surface positioned within the interior cavity of the adapter ring; and
a mounting plate for securing a wiring device, the mounting plate including a seating surface, the mounting plate seating surface arranged and configured to be rotatably received by the adapter ring seating surface when the mounting plate is positioned at least partially within the interior cavity of the adapter ring;
wherein in a first unfastened state, the mounting plate is rotatable relative to the adapter ring and, in a second fastened state, the mounting plate is secured relative to the adapter ring; and
wherein the adapter ring seating surface and the mounting plate seating surface each include a plurality of serrations.

11. The electrical floor box assembly of claim 1, wherein the plurality of inlets/outlets include a borehole including a first portion and a second portion, the first portion having a first diameter arranged and configured to receive a first conduit having a first diameter, the second portion having a second diameter arranged and configured to receive a second conduit having a second diameter, the second diameter being smaller than the first diameter.

12. The electrical floor box assembly of claim 11, wherein the first and second portions are coaxially arranged.

13. The electrical floor box assembly of claim 12, wherein the first and second portions are separated by a stepped surface.

14. The electrical floor box assembly of claim 11, wherein the inlets/outlets are arranged and configured to protrude at least partially into the interior cavity of the floor box.

15. An electrical floor box assembly comprising:
a floor box including a top end, a bottom end, an outer body, an interior cavity extending from the top end thereof, and a plurality of inlets/outlets;
wherein the plurality of inlets/outlets include a borehole including a first portion and a second portion, the first portion having a first diameter arranged and configured to receive a first conduit having a first diameter, the second portion having a second diameter arranged and configured to receive a second conduit having a second diameter, the second diameter being smaller than the first diameter.

16. The electrical floor box assembly of claim 15, wherein the first and second portions are coaxially arranged.

17. The electrical floor box assembly of claim 16, wherein the first and second portions are separated by a stepped surface.

18. The electrical floor box assembly of claim 15, wherein the inlets/outlets are arranged and configured to protrude at least partially into the interior cavity of the floor box.

19. The electrical floor box assembly of claim 15, further comprising:
an adapter ring arranged and configured to be secured at least partially within the interior cavity of the floor box, the adapter ring including an interior cavity and a seating surface positioned within the interior cavity of the adapter ring; and a mounting plate for securing a wiring device, the mounting plate including a seating surface, the mounting plate seating surface arranged and configured to be rotatably received by the adapter ring seating surface when the mounting plate is positioned at least partially within the interior cavity of the adapter ring;

wherein in a first unfastened state, the mounting plate is rotatable relative to the adapter ring and, in a second fastened state, the mounting plate is secured relative to the adapter ring.

20. An electrical floor box assembly, comprising:

a floor box including a top end, a bottom end, an outer body, an interior cavity extending from the top end thereof, and a plurality of inlets/outlets, each inlet/outlet arranged and configured to receive a conduit;

an adapter ring arranged and configured to be secured at least partially within the interior cavity of the floor box, the adapter ring including an interior cavity and a seating surface positioned within the interior cavity of the adapter ring; and a mounting plate for securing a wiring device, the mounting plate including a seating surface, the mounting plate seating surface arranged and configured to be rotatably received by the adapter ring seating surface when the mounting plate is positioned at least partially within the interior cavity of the adapter ring;

wherein:
in a first unfastened state, the mounting plate is rotatable relative to the adapter ring and, in a second fastened state, the mounting plate is secured relative to the adapter ring; and the plurality of inlets/outlets include a borehole including a first portion and a second portion, the first portion having a first diameter arranged and configured to receive a first conduit having a first diameter, the second portion having a second diameter arranged and configured to receive a second conduit having a second diameter, the second diameter being smaller than the first diameter.

21. The electrical floor box assembly of claim 10, wherein the plurality of inlets/outlets include a borehole including a first portion and a second portion, the first portion having a first diameter arranged and configured to receive a first conduit having a first diameter, the second portion having a second diameter arranged and configured to receive a second conduit having a second diameter, the second diameter being smaller than the first diameter.

22. The electrical floor box assembly of claim 1, wherein the mounting plate is securable to the adapter ring in any rotational position.

23. The electrical floor box assembly of claim 10, wherein the mounting plate is securable to the adapter ring in any rotational position.

24. The electrical floor box assembly of claim 20, wherein the mounting plate is securable to the adapter ring in any rotational position.

* * * * *